Figure 1:
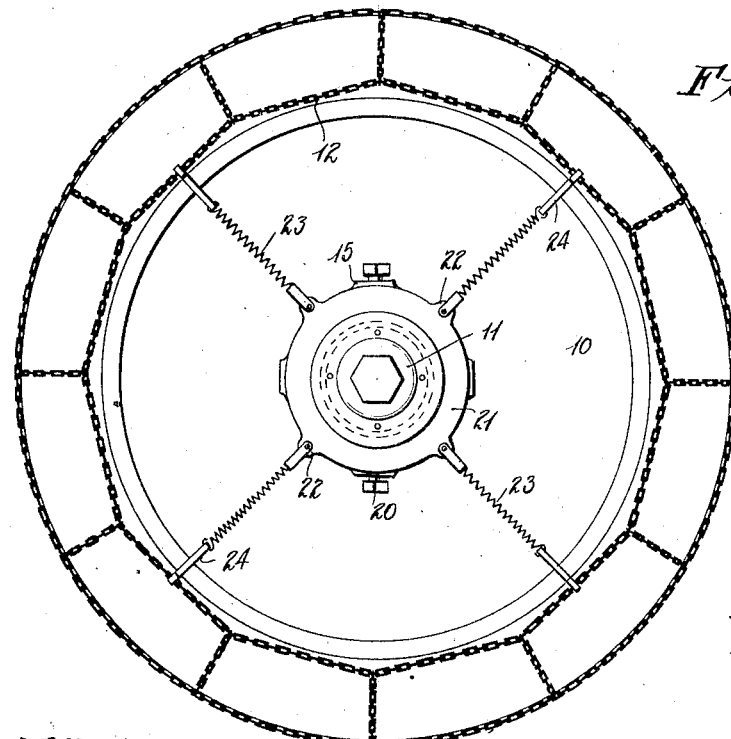

Nov. 10, 1925.  
J. A. McBRADY  
1,560,592  
DEVICE FOR TAKING UP SLACK IN ANTISKID CHAINS  
Filed Sept. 10, 1924

Inventor  
J. A. McBrady

By  
O'Connell & O'Connell  
Attorneys

Patented Nov. 10, 1925.

1,560,592

UNITED STATES PATENT OFFICE.

JOHN A. McBRADY, OF ST. PAUL, MINNESOTA.

DEVICE FOR TAKING UP SLACK IN ANTISKID CHAINS.

Application filed September 10, 1924. Serial No. 736,932.

*To all whom it may concern:*

Be it known that I, JOHN A. McBRADY, a citizen of the United States, residing at St. Paul, in the county of Ramsey and State of Minnesota, have invented certain new and useful Improvements in Devices for Taking Up Slack in Antiskid Chains, of which the following is a specification.

This invention relates to a new and improved tensioning device to be used on automobile wheels for the purpose of taking up the slack in anti-skid chains. The principal object of the invention is to provide a device of the above character that can be quickly and easily arranged in operative relation to the anti-skid chain.

A further object of the invention is to provide a device that will take up the slack in anti-skid chains and which will also serve as a means for retaining the chain in place in the event of breakage of the connecting links thereof.

Various other objects and advantages of my invention will become apparent during the continuance of the following description.

Figure 4:
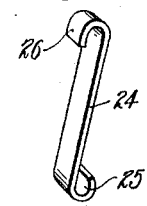
Figure 2:
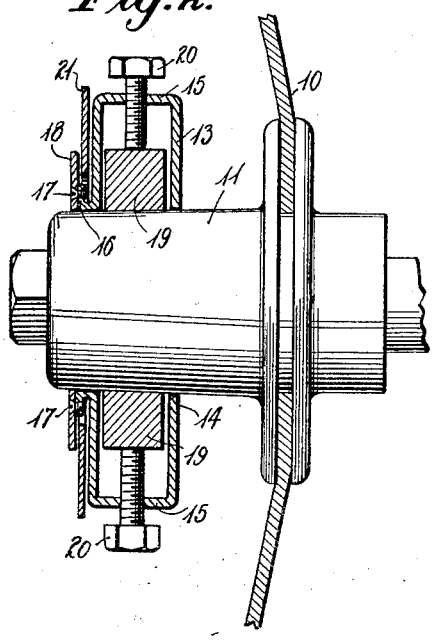
Figure 3:
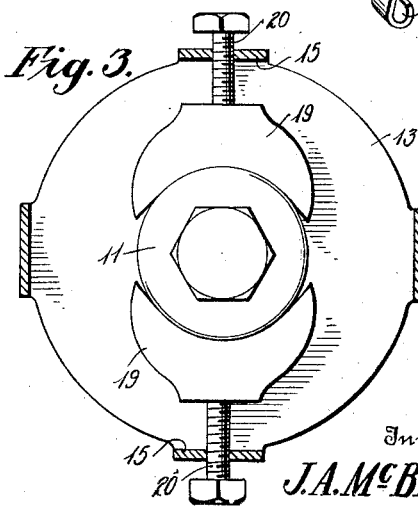

In the drawings:

Figure 1 is a view in side elevation of an automobile wheel equipped with an antiskid chain of conventional type and showing my invention, in its preferred embodiment, arranged in operative relation thereto. Figure 2 is a view in vertical crosssection of the body of the tensioning device. The wheel hub, however, is shown in elevation. Figure 3 is a view in front elevation of the body of the tensioning device with the front portion cut away. Figure 4 is a view in perspective of a connecting clip.

In describing my invention in detail 10 designates an automobile wheel of conventional construction having a hub 11 and being equipped with an anti-skid chain 12, which is also of conventional form. It is to be understood of course that the wheel shown in the drawing has been selected for the purpose of illustration only and that I do not wish to limit myself in any way to the specific application of my invention as shown. This also applies to the anti-skid chain 12.

My invention consists more particularly of a housing or body portion 13 that is provided with a central opening 14 to receive the hub 11 of the automobile wheel. The housing preferably consists of side members connected by spaced cross pieces 15 some of which form bearings as will be hereinafter pointed out. On its front face the housing is provided with an outwardly extending neck terminating in an offset flange 16 arranged concentric to the opening 14 and which has secured thereto as at 17 a retaining ring 18. It will be observed that the retaining ring is thus held in spaced relation to the front face of the housing.

Within the housing I arrange opposed complemental gripping blocks or members 19 which are moved toward each other and into a gripping relation with the hub 11 of the wheel through the medium of bolts or other suitable means that pass through and have threaded engagement with certain of the cross members 15 of the housing. The opposed faces of the blocks 19 are of substantially arcuate configuration to insure snug engagement with the hub 11 and to thus obtain an efficient gripping action thereon.

A compensating ring 21 is arranged over the flange 16 of the housing and between the front face of the housing and the retaining ring 18 as clearly shown in Figure 2. The central opening of the compensating ring is of greater diameter than the external diameter of the neck which supports the flange 16 so that it may move between the housing and the retaining ring as occasion may require. About its outer edges, the ring 21 is provided with ears 22 to which is connected the inner end of contraction means in the form of coil springs 23. At their outer ends the springs are equipped with suitable means to establish a connection with the anti-skid chains 12 which means in the present embodiment is in the form of a clip 24 having its ends bent in opposite directions to form hooks 25 and 26. The hook 25 may be connected with the outer end of the spring 23 as shown in Figure 1 and the hook 26 engaged with a link of the anti-skid chain 12.

When all of the springs 23 are connected to the compensating ring 21 and to the anti-skid chain 12 it will be observed that due to the tension of the springs the slack in the chain will be taken up so as to prevent slapping of the chain against the fenders or chassis of the automobile. It will be further observed that in view of the fact that the compensating ring 21 is movable radially with respect to the housing 13 and to the axle 11 it will thus compensate for unusual tension on any of the springs and thus adjust itself so that an equal tension is exerted at the several points of the chain.

It will be noted that the housing and the parts carried thereby are readily attachable to the hub 11 and that they may be quickly and easily removed when desired.

As outlined above the device of my invention also serves as a means to retain the chain in substantially normal position should any of its links become broken or otherwise disengaged from each other. In other words, it would be almost impossible to lose the chain with my invention in its operative position.

What is claimed is:

1. A device for taking up slack in anti-skid chains comprising a centrally apertured housing adapted to encircle the hub of an automobile wheel and provided on its front face with an outwardly extending neck terminating in an upstanding hub-encircling flange spaced outwardly from the housing, an annular retaining ring secured to the said flange, a compensating ring loosely confined between the said front face of the housing and the said retaining ring and encircling the said neck, said ring being of greater diameter than the external diameter of the said neck so that it is movable radially of the said neck as well as being revolvable thereon, tensionable connecting-devices carried by the said ring and adapted to be connected to the anti-skid chain, and hub-gripping means carried by the said housing and anchoring the latter to the hub of the wheel.

2. A device for taking up slack in anti-skid chains comprising a centrally apertured housing adapted to encircle the hub of an automobile wheel, means for holding the said housing stationary with respect to the wheel hub, a ring loosely connected to one face of the said housing so as to be movable both radially and circumferentially of the wheel hub, and tensionable connecting-devices carried by the said ring for attachment to the anti-skid chain.

3. A device for taking up slack in anti-skid chains comprising a centrally apertured housing adapted to encircle the hub of an automobile wheel, opposed complemental hub-gripping blocks inclosed within the said housing, pressure-exerting means engaged with the said blocks and operated exteriorly of the said housing for moving the blocks into gripping engagement with the wheel hub, a compensating ring loosely connected to one face of the housing so as to be movable both radially and circumferentially of the wheel hub, and tensionable connecting-devices carried by the said ring for attachment to the anti-skid chains.

In testimony whereof I affix my signature.

JOHN A. McBRADY